US007029213B2

(12) United States Patent
Yerly

(10) Patent No.: US 7,029,213 B2
(45) Date of Patent: Apr. 18, 2006

(54) DEVICE FOR REMOVABLY COUPLING TWO COUPLING ELEMENTS AND EQUIPMENT FOR PRE-ADJUSTING MACHINE TOOLS COMPRISING THIS DEVICE

(76) Inventor: Michel Yerly, Le Pecas 53A, Soulce (CH) CH-2864

( * ) Notice: Subject to any disclaimer, the term of this patent is extended or adjusted under 35 U.S.C. 154(b) by 137 days.

(21) Appl. No.: 10/442,573

(22) Filed: May 21, 2003

(65) Prior Publication Data

US 2003/0217451 A1 Nov. 27, 2003

(30) Foreign Application Priority Data

May 21, 2002 (EP) ................................ 02011144

(51) Int. Cl.
*B23Q 16/08* (2006.01)

(52) U.S. Cl. ...................... 409/218; 279/156; 279/159; 269/390; 73/1.79; 33/644

(58) Field of Classification Search ................. 33/520, 33/639, 644; 73/1.79; 279/126, 142, 156, 279/158; 29/447; 269/309
See application file for complete search history.

(56) References Cited

U.S. PATENT DOCUMENTS 3,711,105 A * 1/1973 Johanson .................... 204/279
4,585,240 A * 4/1986 Giffin ......................... 279/111
5,397,231 A 3/1995 Bald .......................... 425/589
5,487,539 A * 1/1996 Obrist ........................ 269/309
6,092,411 A * 7/2000 Tokoi ......................... 73/1.79

FOREIGN PATENT DOCUMENTS

DE 3410359 A1 * 10/1985
DE 37 43 894 A 7/1989
DE 38 31 736 A 3/1990
DE 39 02 854 A 8/1990
DE 4322201 A1 * 1/1995
EP 0 468 383 A 1/1992

* cited by examiner

*Primary Examiner*—Boyer D. Ashley
*Assistant Examiner*—Michael W. Talbot
(74) *Attorney, Agent, or Firm*—Pearne & Gordon LLP

(57) ABSTRACT

Device for coupling in a reproducible position two coupling elements, comprising a first coupling element (2) and a centering plate (4), the centering plate (4) being designed to be fastened to a second coupling element (3), the first coupling element (2) comprising at least one peg (21) comprising at least one spherical portion, the centering plate (4) comprising at least one hollow portion (41) working with the peg (21) during the coupling of said second coupling element (3) to said first coupling element (2) so as to determine the position of said centering plate (4) relative to said first coupling element (2), and equipment for pre-adjusting machine tools comprising this device.

17 Claims, 4 Drawing Sheets

DEVICE FOR REMOVABLY COUPLING TWO COUPLING ELEMENTS AND EQUIPMENT FOR PRE-ADJUSTING MACHINE TOOLS COMPRISING THIS DEVICE

The present application claims the priority of European application EP02011144.9 filed on May 21, 2002, the contents of which are hereby incorporated by reference.

FIELD OF THE INVENTION

The present invention concerns a device for coupling in a reproducible position two coupling elements, in particular a pallet on a chuck, as well as an equipment for pre-adjusting machine tools comprising this device.

RELATED ART

The accurate and reproducible coupling of two coupling elements is a central problem in mechanics, in particular in the field of precision mechanics. The problem is all the more difficult to solve in the case of a removable coupling, i.e. designed to be disassembled and reassembled several times and where the two coupling elements must be situated in the same relative position to one another at each reassembling.

In order to avoid tedious positioning checks at each reassembling by means of equipment that is sometimes complex and expensive, guiding references are used on the surfaces of the coupling elements that will come into contact with one another. Rigid pegs on one of the two coupling elements and capable of being inserted in recesses on the other coupling are often used and thus determine the relative position of the two devices with a certain accuracy. This accuracy is however limited by two main factors: the machining precision of the references and the play necessary for coupling two rigid elements, for example a peg in a recess. It is thus difficult to obtain, with such systems, an accurate positioning of a coupling device on another.

In order to remove the play between two coupling elements, an intermediary element is sometimes used that is often flexible and that becomes slightly deformed when the two coupling elements are coupled.

Such an intermediary element can also contribute to positioning the coupling elements relative to one another, for example by integrating part of the guiding references.

EP111092 describes for example a coupling system having a first coupling element designed to drive the second coaxial coupling element in its rotational movement. The intermediary element is a driver plate fastened to the second coupling element. The driver plate comprises bores into which are inserted partially conical driving pegs worked onto the surface of the first coupling element, determining thus the relative position of the two coupling elements. The conical shape of the driving pegs causes the edge of the bores to become at least partially deformed, thus ensuring the centering and correct radial positioning, on the first coupling element, of the driver plate and, consequently, of the second coupling element to which it is fastened.

A system such as described in EP111092 comprising conical driving pegs worked directly on the first coupling element is particularly adapted to a coupling system in which a considerable rotational force is transmitted between two coaxial coupling elements. However, it has the major disadvantage that its aligning accuracy depends essentially on the machining precision of the conical pegs. Yet it is difficult and expensive to obtain a high precision during the manufacture of such profiles.

In many applications, such as for example in the field of the pre-adjustment of machine tools, the accuracy of the positioning, for example of the tool to be pre-adjusted, is essential, whereas the need for a force to be exerted, for example on the tool, is low or even non-existent.

Pre-adjusting a machine tool before using it on a machining center makes it possible to shorten or even avoid adjusting the tool on the machining center before using it. Thus, the machine tool can be pre-adjusted on a pre-adjusting machine whilst the machining center is operating with another tool, thus maximizing the productivity rate of the machining center. In order to be pre-adjusted correctly on the pre-adjusting machine, the machine tool must be in a configuration similar to that which it will meet on the machining center. Pre-adjusting systems thus resort to specific gauges for each machining center, reproducing for example the configuration of the elements for fastening the tool on the machining center. These gauges must also be very accurately positioned relative to the reference of the pre-adjusting machine so that the tool's pre-adjusting can be as accurate as possible. On the other hand, practically no force is exerted on the machine tool during this operation. For such an application, for example, the system described by EP111092 is too complex and too expensive if the necessary positioning accuracy is to be achieved.

Some of the prior art pre-adjusting machines are however adapted to receive pre-adjusting equipment comprising several gauges, disposed for example on a rotating barrel, allowing a single pre-adjusting machine to pre-adjust the tool of different machining centers. The number of gauges is however limited by the number of positions of the barrel and their type is determined during manufacture of the pre-adjusting equipment, thus preventing it from being adapted to pre-adjusting tools of any new machining center.

An aim of the present invention is thus to propose a simple manufacturing device allowing an accurate and reproducible positioning of two coupling elements.

Another aim of the present invention is to propose a device allowing an accurate and reproducible positioning of two coupling elements at a reduced cost.

Another aim of the present invention is to propose an equipment for pre-adjusting machine tools that is modular and adaptable for pre-adjusting tools of any new machining center.

BRIEF SUMMARY OF THE INVENTION

According to the invention, these aims are achieved by the pre-adjusting device and the equipment of the corresponding independent claims, preferred embodiments being furthermore indicated by the dependent claims.

In particular, these aims are achieved by a device comprising a first coupling element and a centering plate designed to be fastened to a second coupling element to ensure its reproducible positioning on the first coupling element, the first coupling element comprising at least one peg, the centering plate comprising at least a hollow part working with the peg during the coupling of the second coupling element to the first coupling element so as to determine the position of the centering plate relative to the first coupling element, the peg or pegs comprising at least one spherical portion allowing an accurate positioning by means of elements that are less complex and consequently less expensive to manufacture.

These aims are also achieved in particular by an equipment for pre-adjusting machine tools, designed to work with a reference surface of a pre-adjusting machine and comprising at least one gauge, the position of the gauge relative to said reference surface being determined with precision, the gauge being fastened to a first coupling element that can be coupled removably and reproducibly to a second coupling element designed to be fastened on the reference surface of the pre-adjusting machine, thus allowing several pallets to be used, each bearing a different gauge adapted each to the tools of a different machining center and offering new possibility as regards modularity and adaptability of the pre-adjusting equipment.

DESCRIPTION OF THE DRAWINGS

The invention will be better understood by reading the description of a preferred embodiment given by way of illustrative and non-limiting example and illustrated by the attached drawings in which.

DETAILED DESCRIPTION OF THE INVENTION

Figure 4:
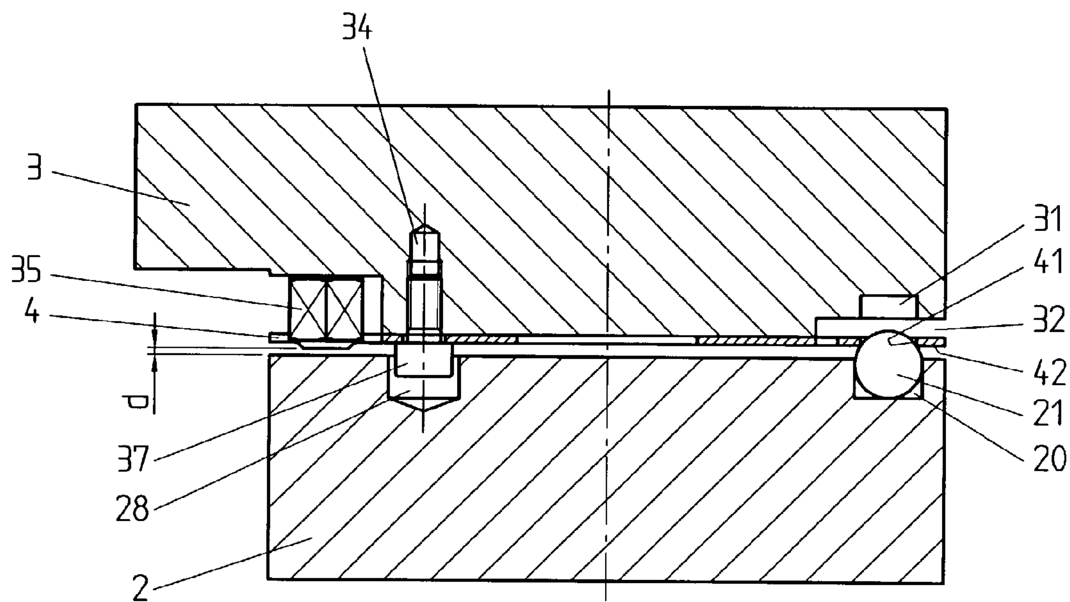
FIG. 4 shows a cross-sectional view of the device and of the second coupling element in released position.

In a preferred embodiment of the invention, illustrated in FIG. 4, the device comprises a first coupling element 2 comprising pegs 21 and a centering plate 4 fastened to a second coupling element 3.

The first coupling element (FIG. 1) is a chuck 2 onto which can be fastened, in a removable manner and through not-represented fastening means, for example interchangeable pallets. On the upper side of the chuck 2, recesses 20 are machined that are preferably cylindrical or semi-spherical and designed to receive pegs. With reference to FIGS. 4 and 5, the pegs 21 are preferably constituted by balls 21 having a known and accurate diameter, driven home into the recess 20.

Figure 2:
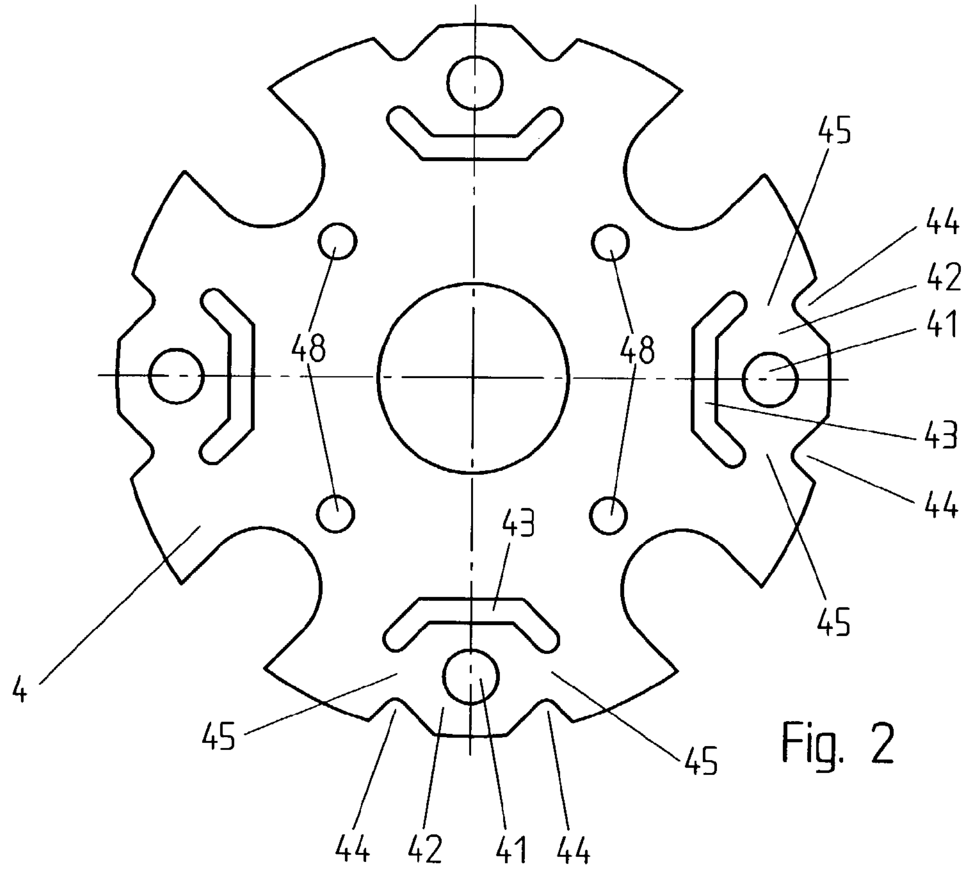
FIG. 2 shows the device's centering plate.

The centering plate 4 (FIG. 2) is preferably machined in a sheet of hard material having a certain elasticity, for example in a steel sheet. The centering plate 4 comprises hollow cavities 41, for example circular holes 41, whose number and arrangement correspond to the number and arrangement of the bores 20 on the chuck 2. Around each circular hole 41, a flexible zone 42 demarcated by notches 43, 44 is defined. Each flexible zone is connected to the rest of the centering plate by a torsion zone 45 that allows the flexible zone 42 to pivot around a not-represented axis connecting the two torsion zones 45. It is also possible to demarcate the flexible zone 42 by zones where the plate's thickness is diminished, thus rendering easier the deformation of these zones under the effect of an external force. This variant embodiment has however the disadvantage that the machining of the plate is more complicated, and consequently more expensive, than that of the plate according to the previously described preferred embodiment of the invention wherein the notches 43, 44 are preferably formed by simple stamping. The centering plate 4 further comprises holes 48 allowing it for example to be fastened, by means of screws passing through these holes 48, to a second coupling element.

In a preferred embodiment, the device according to the invention is preferably associated to a pallet 3 (FIG. 3) comprising on its lower side threaded openings 34 whose arrangement corresponds to that of the holes 48 of the centering plate 4, thus allowing the latter to be fastened by means of screws or bolts. Other means for fastening the centering plate 4 on the pallet 3 can be conceived by the one skilled in the art. The centering plate 4 could for example be riveted or soldered to the pallet 3. The pallet 3 has for example a circular base of the same diameter as the centering plate 4 and as the chuck 2, as well as a square upper plate, allowing to arrange or fasten various elements, for example gauges for pre-adjusting machine tools. The pallet 3 comprises not-represented fastening means designed to work with the fastening means of the chuck 2 in order to fasten it to the latter, preferably in a removable manner.

Figure 1:
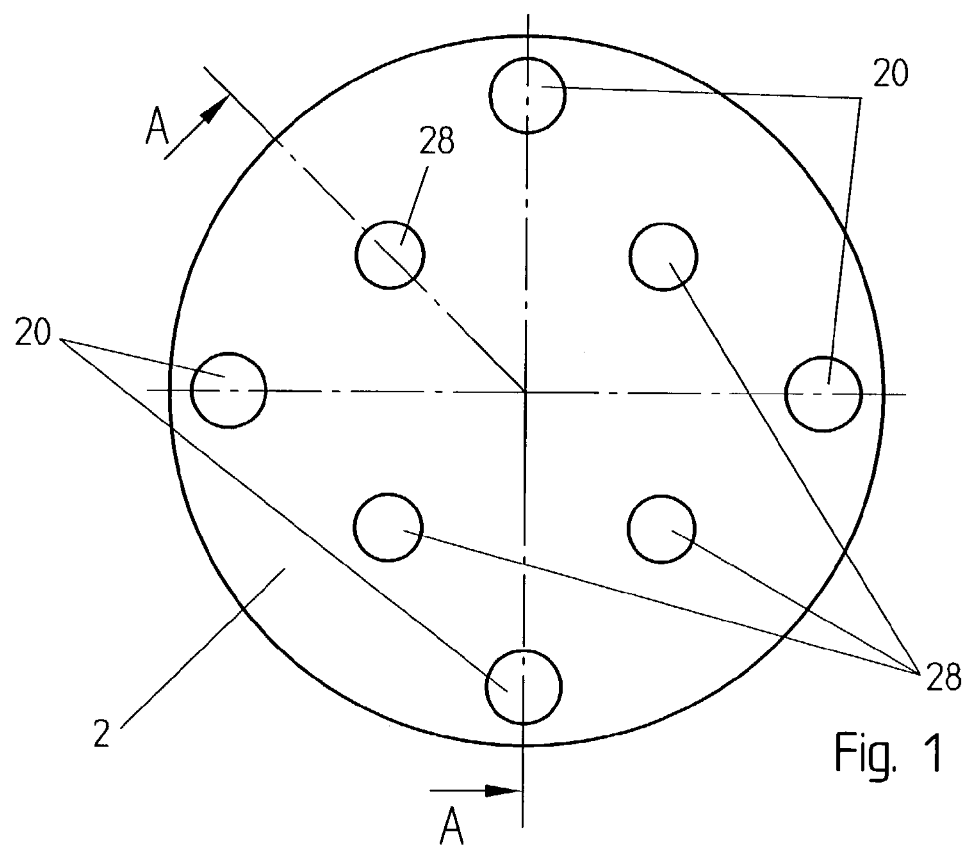
FIG. 1 shows the first coupling element of the device.
Figure 5A:
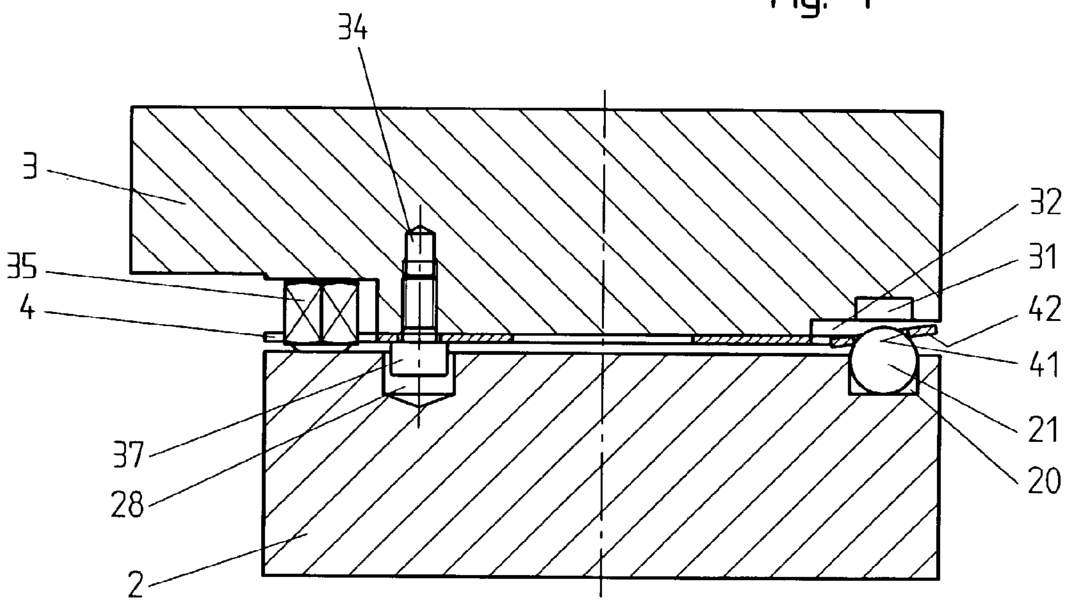
FIG. 5*a* shows a cross-sectional view of the device and of the second coupling element in closed/tight position.

FIG. 4 shows a cross-sectional view along the axis A—A illustrated in FIG. 1 of the preferred embodiment of the device according to the invention associated to the pallet 3, before the fastening elements are tightened. FIG. 5*a* represents a cross-sectional view along the same axis A—A of the same elements, after tightening of the fastening elements.

The centering plate 4 is fastened to the pallet 3 by means of screws 37. Clearances 28 are provided on the chuck 2 in order to avoid all contact of the screw heads 37 with the chuck 2 when the pallet 3 is positioned on the chuck 2. The pallet 3 is equipped with wedges 35 determining the minimal distance between the chuck 2 and the pallet 3. These wedges 35 are for example screwed in threaded openings 36 provided for this purpose on the pallet 3. Clearances are provided on the centering plate 4 to allow a direct contact of the wedges 35 on the surface of the chuck 2.

The diameter of the circular holes 41 on the centering plate 4 is less than the diameter of the balls 21, so that the circumference of each circular hole 41 rests on the balls 21 whereas the wedges 35 are at a distance d from the chuck 2. Preferably, this distance d is less than 2 millimeter, preferably 0.3 millimeters. Other dimensions are however possible.

Figure 5B:
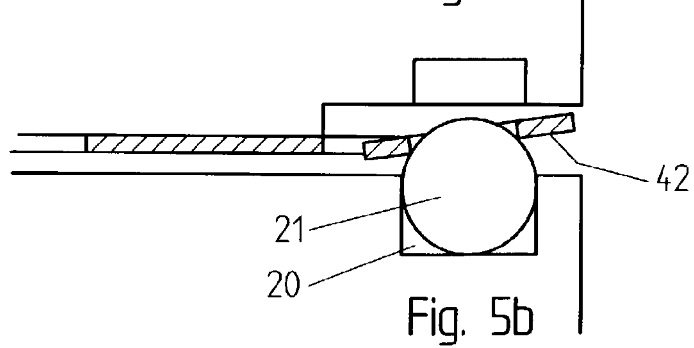
FIG. 5*b* shows a detail of the cross-section of FIG. 5*a*.

During tightening of the not-represented fastening means, the pallet 3 is moved closer to the chuck 2, acting against the resting force of the edges of the holes 41 on the balls 21. The circular holes 41 then slide on the circumference of the balls 21, thus causing the torsion zones 45 to become deformed and the flexible zones 42 to pivot towards the center of the device. This pivoting illustrated in FIGS. 5*a* and 5*b* is made possible by the clearances 32 provided on the lower side of the pallet 3. The regularity of the deformation of the torsion zones 45 during pivoting is ensured by the resting zones 33 constituted by the edges of the clearances 32, visible in FIG. 3, resting on the torsion zones 45 when the centering plate 4 is fastened on the pallet 3. The fact that the centering plate 4 is pinned against the lower side of the pallet 3 ensures that the essential part of its deformation when the pallet 3 is tightened on the chuck 2 occurs around the flexible zones 42 opposite the clearances 32, in the torsion zones 45. The resting zones 33 thus allow the regularity of this deformation to be controlled. Their symmetrical arrangement around each circular hole 41 guarantees in particular a repetitive and identical torsion to each flexible zone 42. Additional clearances 31 are preferably provided on the pallet 3 opposite the balls 21, so as to avoid any direct contact between the balls 21 and the pallet 3 when the fastening means are tightened.

The fact that the circumference of the hollow cavities 41 on the semi-spherical part of the pegs 21 ensures that the flexible zones 42 pivot regularly when the fastening elements are tightened. The forces causing the flexible zones 42 to pivot are spread more or less regularly between the flexible zones, thus ensuring an accurate and reproducible centering of the centering plate 4 and consequently of the second coupling element 3 on the first coupling element 2.

The accuracy of the relative position of the two coupling elements, for example of the chuck 2 and the pallet 3, thus depends only on the precision and regularity of the diameter of the balls 21, on the diameter and position of the bores 20 and on the diameter and position of the circular holes 41. Calibrated balls are common and relatively inexpensive mechanical components, produced industrially. The machining of circular holes 41 or of preferably cylindrical bores 20 of accurate dimensions and position is easy and can be performed in a single operation, thus minimizing also the risks of inaccuracies. The centering plate 4 with its holes 41 and its notches 44, 43 is thus for example preferably formed in a single stamping operation from a steel sheet of uniform thickness. The costs of such a machining are considerably lower than the costs entailed by the machining of non-cylindrical and raised elements having the same precision.

The manufacturing precision of the second coupling element 2 thus has no influence on the reproducibility of the relative positioning of the two coupling elements. The wedges 35 only must have accurate dimensions in order to guarantee a correct and regular distance between the two coupling elements.

In order for the positioning to be reproducible, it is also necessary for the deformation of the centering plate 4 when the fastening elements are tightened to be completely reversible. It must thus be performed in the flexible zone of the material used for its manufacture.

Figure 3:
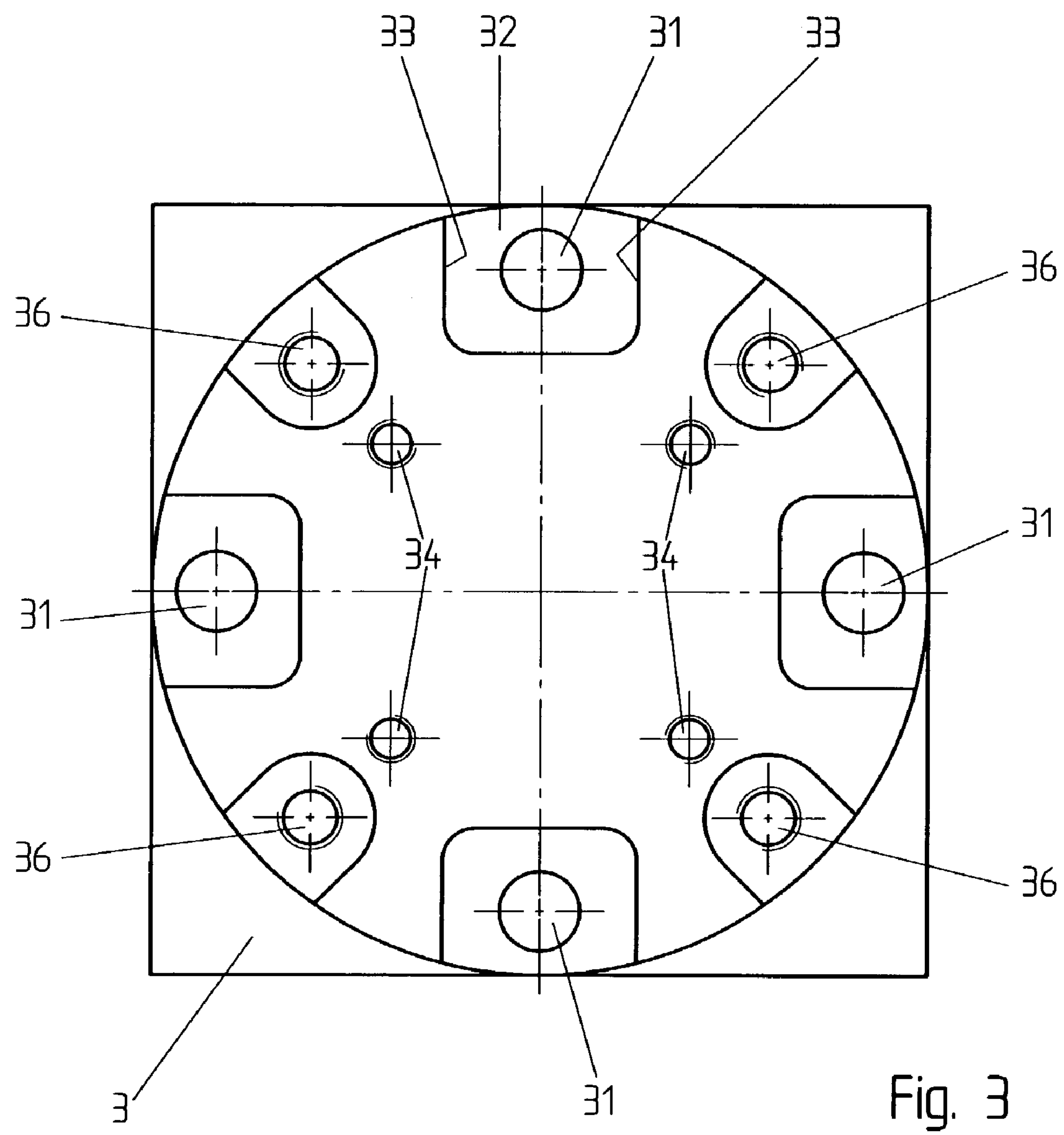
FIG. 3 shows the second coupling element to which the centering plate is designed to be fastened.

In the illustration given here above of a preferred embodiment of the device according to the invention, the centering plate is fastened to a pallet 3 as represented in FIG. 3. The centering plate 4 according to the preferred embodiment of the invention can however be fastened to any other second coupling element whose position relative to the first coupling element 3 must be precisely guaranteed.

In the preferred embodiment of the invention described here above, the pegs 21 comprising at least one spherical portion are formed by the protruding part of a ball 21 driven home in a bore 20 of the chuck 2. The one skilled in the art will however understand that it is also possible to form pegs comprising at least one spherical portion through other means, for example by means of cylindrical pins having a semi-spherical extremity and lodged in the bores of the first coupling element, or by spherical portions, for example half-spheres, fastened onto the surface of the first coupling element, for example by gluing, soldering or screwing. It is also possible to machine pegs comprising at least a spherical portion directly on the first coupling element. This latter embodiment has however the disadvantage of considerably increasing the production costs of the device.

The one skilled in the art will also understand that the number of pegs 21 and their arrangement can be different. Preferably, at least three pegs 21 will be used in order to define precisely the plane of the pallet 3.

One application of the present invention is for example in the field of pre-adjusting machine tools.

The application to an equipment for pre-adjusting a device allowing the precise and reproducible positioning, on a fixed chuck relative to the guiding references of the pre-adjusting machine, of one or several interchangeable pallets having for example each a different gauge, offers new and unexpected possibilities as compared to the prior art pre-adjusting equipment. Such an application allows a pre-adjusting machine to be equipped so that it can pre-adjust the tools of any existing machining center. Such an application further allows the number and type of machines to be chosen precisely according to which the pre-adjusting machine must be equipped. Such an application also allows the pre-adjusting machine to be equipped at any time for pre-adjusting the tools of a new machining center, including a machining center that was unknown at the time the pre-adjusting machine was designed.

Figure 6:
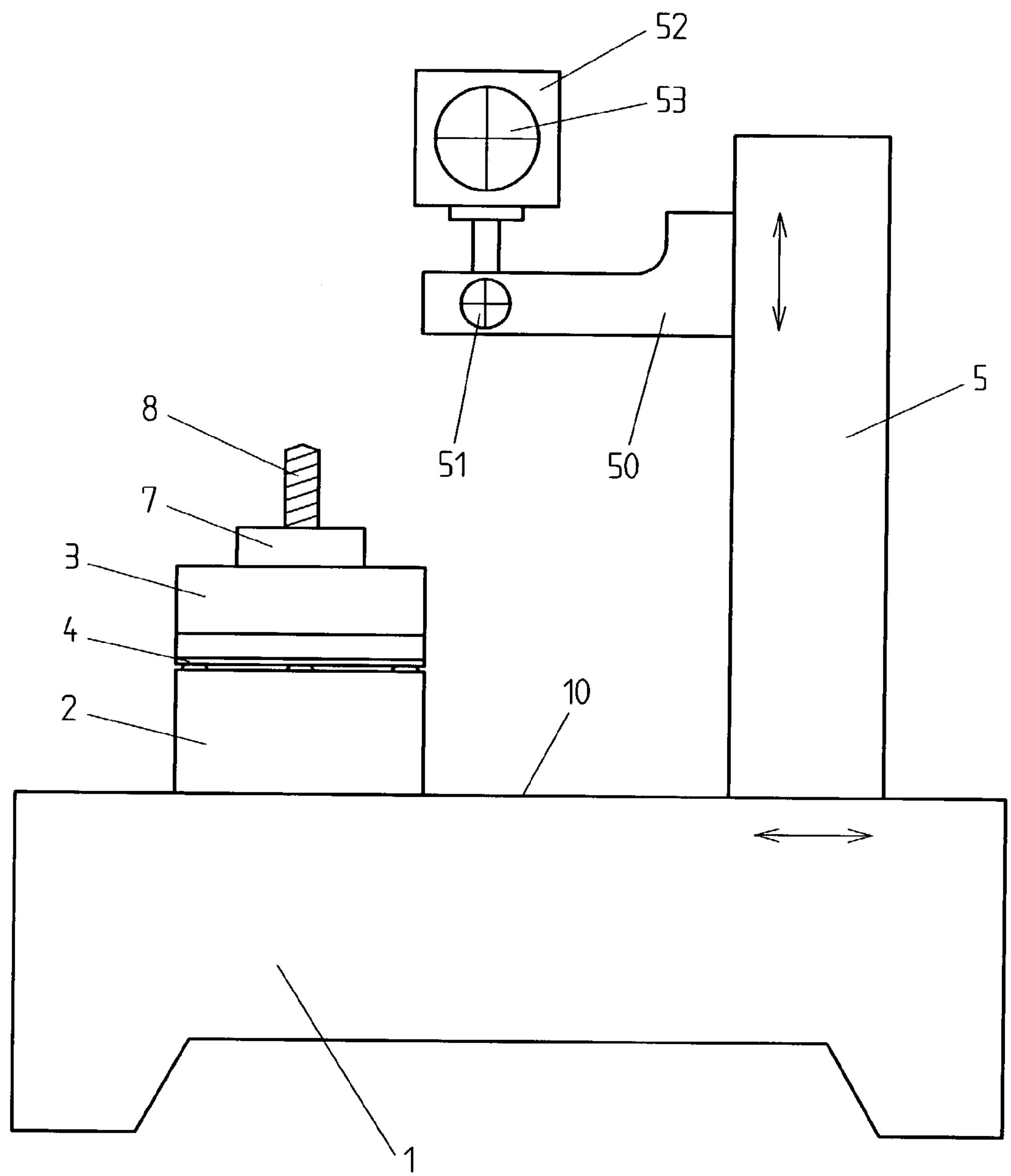
FIG. 6 shows a machine for pre-adjusting machine tools associated to a pre-adjusting equipment using a device according to the invention.

FIG. 6 represents an example of pre-adjusting machine associated to a pre-adjusting equipment comprising such a device. The pre-adjusting machine 1 has a reference surface 10. A column 5 associated to an arm 50 allows a pre-adjusting control system, for example an optical aim system 51 to move, for example in a plane perpendicular to the reference surface 10. The position of the center of the optical aim system 51 relative to the reference plane 10 is known perfectly. A display 52 generally allows an enlarged representation 53 of the image captured by the aim system 51 to be visualized in order to allow a higher precision in the visual control of the pre-adjusting of the machine tool 8.

At least one gauge 7 is fastened on a pallet 3. A chuck 2 is fastened onto the reference surface 10. The position of each gauge 7 on its pallet 3 is determined in such a manner that when the pallet 3 is removably coupled to the chuck 2, the position of the gauge 7 relative to the reference surface 10 is known precisely and is adapted to the pre-adjustment of the corresponding machine tool 8.

The pre-adjusting equipment associated with the pre-adjusting machine 1 can comprise several pallets 3 preferably equipped each with a different gauge 7, thus offering a high modularity to the pre-adjusting machine 1. The number of pallets 3 is not limited and it is possible at any time to add a pallet 3 provided with a new gauge 7 to the pre-adjusting equipment.

In order to ensure the accuracy of such a pre-adjusting machine 1, it is necessary that each time a pallet 3 is coupled again to the chuck 2, the position of the gauge 7 relative to the reference surface 10 should be identical. Thus, the positioning of the pallet 3 on the chuck 2 must be reproducible with the highest precision.

For this, the pre-adjusting equipment comprising the chuck 2 and at least one pallet 3 is equipped, for example, of centering plates 4 as described previously fastened to each pallet 3 and the chuck 2 is equipped of pegs comprising at least one spherical portion, constituted for example by the protruding part of balls inserted in bores on its upper surface. The accurate positioning of each pallet 3 during each coupling to the chuck 2 is thus guaranteed in the manner described here above.

The one skilled in the art will however understand that the first coupling element equipped with pegs comprising at least one spherical portion and the centering plate described here above can also be adapted to other applications, in particular to any application where two coupling elements must be associated with a high precision and in a reproducible manner.

The invention claimed is:

1. Device comprising a first coupling element and a centering plate, said centering plate being designed to be fastened to a second coupling element to ensure the reproducible positioning of said second coupling element onto said first coupling element, said first coupling element comprising at least three pegs, said centering plate lying in a plane and comprising at least three hollow portions working with one of said at least three pegs during the coupling of said second coupling element to said first coupling element so as to determine the position of said centering plate relative to said first coupling element, each one of said at least three pegs comprising at least one spherical portion, wherein around each one of said at least three hollow portions a flexible zone is demarcated by at least one notch and connected to the rest of said centering plate by two torsion zones allowing the pivoting of said flexible zone about an axis in said plane relative to the rest of said centering plate and out of the plane of the centering plate on each side of said axis when said first coupling element is fastened onto said second coupling element.

2. Device comprising a first coupling element and a centering plate of generally constant thickness, said centering plate being designed to be fastened to a second coupling element to ensure the reproducible positioning of said second coupling element onto said first coupling element, said first coupling element comprising at least three pegs, said centering plate lying in a plane and comprising at least three hollow portions, each one of said at least three hollow portions working with one of said at least three pegs during the coupling of said second coupling element to said first coupling element so as to determine the position of said centering plate relative to said first coupling element, each one of said at least three pegs comprising at least one spherical portion, wherein around each one of said at least three hollow portions a flexible zone is demarcated by at least one notch and connected to the rest of said centering plate by two torsion zones allowing the pivoting of said flexible zone about an axis in said plane relative to the rest of said centering plate and out of the plane of the centering plate on each side of said axis when said first coupling element is fastened onto said second coupling element.

3. Equipment for pre-adjusting machine tools, designed to work with a reference surface of a pre-adjusting machine and comprising at least one gauge, the position of said at least one gauge relative to said reference surface being precisely determined, said at least one gauge being fastened to a pallet capable of being coupled removably and reproducibly to a chuck designed to be fastened onto said reference surface, said equipment further comprising a centering plate designed to be fastened onto said pallet to ensure the reproducible positioning of said pallet onto said chuck, said chuck comprising at least three pegs, said centering plate lying in a plane and comprising at least three hollow portions, each one of said at least three hollow portions working with one of said at least three pegs during the coupling of said pallet to said chuck so as to determine the position of said centering plate relative to said chuck, each one of said at least three pegs comprising at least one spherical portion, wherein around each one of said at least three hollow portions a flexible zone is demarcated by at least one notch and connected to the rest of said centering plate by two torsion zones allowing the pivoting of said flexible zone about an axis in said plane relative to the rest of centering plate and out of the plane of the centering plate on each side of said axis when said first coupling element is fastened onto said second coupling element.

4. Device of claim 1, wherein the pivoting of said flexible zone occurs around an axis connecting said two torsion zones.

5. Device of claim 4, wherein the pivoting of said flexible zone occurs towards the center of said device.

6. Device of claim 1, wherein said centering plate is of a generally constant thickness.

7. Device of claim 1, wherein said at least three hollow portions being circular holes of a diameter less than the maximal diameter of said at least three pegs.

8. Device of claim 1, said first coupling element being a chuck designed to support pallets.

9. Device of claim 8, said second coupling element being a pallet.

10. Device of claim 1, said at least three pegs being each constituted by the protruding part of a ball driven home into a cavity of said first coupling element.

11. Device of claim 2, wherein the pivoting of said flexible zone occurs around an axis connecting said two torsion zones.

12. Device of claim 11, wherein the pivoting of said flexible zone occurs towards the center of the device.

13. Device of claim 2, wherein said at least three hollow portions being circular holes of a diameter less than the maximal diameter of said at least three pegs.

14. Device of claim 2, said first coupling element being a chuck designed to support pallets.

15. Device of claim 14, said second coupling element being a pallet.

16. Device of claim 2, said at least three pegs being each constituted by the protruding part of a ball driven home into a cavity of said first coupling element.

17. Equipment according to claim 3, wherein said centering plate is of generally constant thickness.

* * * * *